(12) United States Patent
Sotoca (10) Patent No.: US 11,728,080 B2
(45) Date of Patent: Aug. 15, 2023

(54) ACTUATOR

(71) Applicant: Otis Elevator Company, Farmington, CT (US)

(72) Inventor: Javier Munoz Sotoca, Madrid (ES)

(73) Assignee: OTIS ELEVATOR COMPANY, Farmington, CT (US)

( * ) Notice: Subject to any disclaimer, the term of this patent is extended or adjusted under 35 U.S.C. 154(b) by 700 days.

(21) Appl. No.: 16/730,030

(22) Filed: Dec. 30, 2019

(65) Prior Publication Data

US 2020/0402695 A1 Dec. 24, 2020

(30) Foreign Application Priority Data

Jun. 24, 2019 (EP) .................................... 19382529

(51) Int. Cl.
*H01F 7/16* (2006.01)
*H01F 7/121* (2006.01)
*B66B 5/16* (2006.01)
*H01F 7/08* (2006.01)

(52) U.S. Cl.
CPC ............. *H01F 7/121* (2013.01); *B66B 5/16* (2013.01); *H01F 7/081* (2013.01); *H01F 7/16* (2013.01)

(58) Field of Classification Search
CPC ...................................................... H01F 7/087
USPC ................ 335/119–121, 184, 232, 242, 265
See application file for complete search history.

(56) References Cited

U.S. PATENT DOCUMENTS

| | | | | |
|---|---|---|---|---|
| 723,119 A * | 3/1903 | Von Zweigbergk | ... | H01H 50/20 200/16 R |
| 930,928 A * | 8/1909 | Berry | ................... | H01H 50/323 335/184 |
| 2,131,942 A * | 10/1938 | Evans | .................. | B60Q 1/1415 335/121 |
| 2,611,013 A * | 9/1952 | Ture | ....................... | H01H 71/44 335/242 |

(Continued)

FOREIGN PATENT DOCUMENTS

| | | |
|---|---|---|
| DE | 102010036250 B4 | 3/2012 |
| DE | 102017201470 A1 | 8/2018 |

(Continued)

OTHER PUBLICATIONS

European Search Report for application EP 19382529, dated Dec. 5, 2019, 76 pages.

*Primary Examiner* — Alexander Talpalatski
(74) *Attorney, Agent, or Firm* — Cantor Colburn LLP (57) ABSTRACT

An electromechanical actuator device comprises a fixed part, a first movable part and a second movable part each arranged to move with respect to the fixed part along an actuation direction. A conductive coil (20) is wrapped around a core (28) and is housed within the fixed part (4). The first movable part (6) is coupled to the fixed part (4) by at least one restorative component (10) such that, in a working position, the first movable part (6) is separated from the fixed part (4) along the actuation direction (22) by a first actuation distance (d1). The second movable part (8) is coupled to the first movable part (6) by at least restorative component (16) such that, in the working position, the second movable part (8) is separated from the first movable part (6) along the actuation direction (22) by a second actuation distance (d2).

13 Claims, 10 Drawing Sheets

(56) References Cited

U.S. PATENT DOCUMENTS

| | | | | |
|---|---|---|---|---|
| 4,540,965 A * | 9/1985 | Hattori | .................... | H01H 3/503 |
| | | | | 335/265 |
| 4,546,955 A * | 10/1985 | Beyer | ................ | F16K 31/0679 |
| | | | | 251/129.1 |
| 5,422,617 A * | 6/1995 | Brown | ...................... | H01F 7/13 |
| | | | | 335/266 |
| 5,986,528 A * | 11/1999 | Meier | ...................... | H01H 1/54 |
| | | | | 335/184 |
| 6,047,718 A * | 4/2000 | Konsky | ............... | F16K 31/0603 |
| | | | | 335/265 |
| 6,677,844 B1 * | 1/2004 | Gorospe | .................... | H01F 7/16 |
| | | | | 70/277 |
| 7,093,778 B1 * | 8/2006 | Hellmich | ................ | F02M 61/08 |
| | | | | 239/585.4 |
| 7,404,540 B2 * | 7/2008 | Cocca | .................... | H01F 7/1607 |
| | | | | 335/297 |
| 8,552,823 B2 * | 10/2013 | Isonaga | ...................... | H01F 7/16 |
| | | | | 335/265 |
| 8,786,387 B2 * | 7/2014 | Fong | ...................... | H01H 51/24 |
| | | | | 335/229 |
| 2013/0265125 A1 * | 10/2013 | Thode | ...................... | H01F 7/13 |
| | | | | 335/255 |

FOREIGN PATENT DOCUMENTS

| | | |
|---|---|---|
| EP | 0107445 A1 | 5/1984 |
| WO | 2009106080 A1 | 9/2009 |

* cited by examiner

ACTUATOR

FOREIGN PRIORITY

This application claims priority to European Patent Application No. 19382529.6, filed Jun. 24, 2019, and all the benefits accruing therefrom under 35 U.S.C. § 119, the contents of which in its entirety are herein incorporated by reference.

TECHNICAL FIELD

This disclosure relates to electromechanical actuators for elevator systems, particularly electronic safety actuators, with an improved actuation range.

BACKGROUND ART

Elevator systems are generally provided with one or more 'electronic safety actuators' (ESAs) which, when triggered, provide an actuating force that prevent movement of the elevator car within the hoistway. Typically, an ESA actuates a suitable component, such as a wedge, into contact with a fixed part of the hoistway (i.e. external to the ESA itself) such as a guide rail so as to prevent motion.

Generally, the ESA has a 'reset position' and a 'working position'. In the reset position, the actuator is held such that it does not engage with the rail, e.g. the wedges are 'held back'. Conversely, in the working position, the actuator triggers the 'safeties', such that these engage with the rail. For safety purposes, the 'normal' position (i.e. the position when no power is applied) is the reset position, such that in the event of power failure, the ESA fails to the working position and prevents motion of the elevator car.

This behaviour is, at least in some ESA devices, achieved through the use of a 'split' construction having a fixed part and a movable part, each constructed from a ferromagnetic material such as iron. Typically, the fixed part and the movable part are mechanically coupled to one another via one or more compression springs. A compression spring may, in the absence of any other external forces, force the fixed and movable parts to physically separate, such that there is a gap between them. This is the 'working position' of the ESA device.

The fixed part is provided with a coil, through which an electric current may be passed in order to induce a magnetic field. When the ESA device is active (i.e. when current is passed through the coil), the induced magnetic field attracts the movable part such that it overcomes the force of the spring, thus causing the movable part to move closer to the fixed part, i.e. into the 'reset position'.

Thus if the current flowing through the coil is reduced, e.g. to zero, such as in the case of a power failure or following a command from a controller, the attractive electromagnetic force from the coil is reduced, e.g. to zero, and the force from the compressive springs dominates, forcing the movable part away from the fixed part and setting the ESA device to the working position. Once this occurs, a 'reset' is needed in order to bring the movable part back to the reset position, e.g. to once again allow movement of the elevator car in the hoistway by removing the wedges from the guide rail.

Generally speaking, the separation between the moving and fixed parts in the working position, i.e. the 'actuation distance' of the ESA device, may be around 2-3 mm. In conventional arrangements, known in the art per se, intermediate levers are typically employed to trigger elevator safety mechanisms that are further from the ESA device than the actuation distance provided by the ESA device itself. However, the present disclosure seeks to provide an improved arrangement that can cover larger actuation distances, preferably without the need for such levers.

SUMMARY OF THE DISCLOSURE

In accordance with a first aspect, the present disclosure provides an electromechanical actuator device comprising: a fixed part, a first movable part and a second movable part, each of said movable parts being arranged to move with respect to the fixed part along an actuation direction, wherein the fixed part, the first movable part, the second movable part, and the core each comprise a respective ferromagnetic material; and a conductive coil wrapped around a core, said conductive coil being housed at least partially within the fixed part; wherein the electromechanical actuator device is arranged such that: the first movable part is coupled to the fixed part by at least one restorative component such that, in a working position, the first movable part is separated from the fixed part along the actuation direction by a first actuation distance; and the second movable part is coupled to the first movable part by at least one restorative component such that, in the working position, the second movable part is separated from the first movable part along the actuation direction by a second actuation distance; when an electric current is passed through the conductive coil, an induced magnetic field attracts the first and second movable parts toward the fixed part, thereby reducing the first and second actuation distances.

This first aspect extends to an elevator system comprising the electromechanical actuator device outlined above. Thus, the present disclosure also provides an elevator system comprising an elevator car arranged to move within a hoistway and an electromechanical actuator device arranged to prevent movement of said elevator car within the hoistway, wherein the electromechanical actuator device comprises: a fixed part, a first movable part and a second movable part, each of said movable parts being arranged to move with respect to the fixed part along an actuation direction, wherein the fixed part, the first movable part, the second movable part, and the core each comprise a respective ferromagnetic material; and a conductive coil wrapped around a core, said conductive coil being housed at least partially within the fixed part; wherein the electromechanical actuator device is arranged such that: the first movable part is coupled to the fixed part by at least one restorative component such that, in a working position, the first movable part is separated from the fixed part along the actuation direction by a first actuation distance; and the second movable part is coupled to the first movable part by at least one restorative component such that, in the working position, the second movable part is separated from the first movable part along the actuation direction by a second actuation distance; when an electric current is passed through the conductive coil, an induced magnetic field attracts the first and second movable parts toward the fixed part, thereby reducing the first and second actuation distances; wherein the elevator car is prevented from moving within the hoistway when the electromechanical actuator device is in the working position.

Thus it will be appreciated that aspects of the present disclosure provide an improved electromechanical actuator device in which the movable part of the actuator is 'split' into multiple movable parts, separated in series by restorative components. These restorative components act to ensure that, in the working position, the fixed and movable parts are separated by the required distance, e.g. to trigger safeties that interact with a rail and prevent movement of an elevator car. In other words, the restorative components provide a 'default' force that acts to operate the device in the working position, where this default force must be overcome by an additional, opposite force in order to maintain the reset position.

In some examples, the restorative components each comprise a resilient member, preferably a spring, more preferably a compression spring, i.e. the spring(s) are able to be compressed in their 'rest state' and, once compressed, exert a restoring force to oppose the applied compression. It will be appreciated that, in practice, any suitable type of resilient members could be used to couple the fixed and movable parts, including but not limited to coil spring, pneumatic (i.e. air), hydraulic, and/or polymer based restorative components that provide the same function.

It will be appreciated that in this advantageous arrangement, the magnetic field induced by the coil will be stronger closer to the fixed part (where the coil is located), and thus will provide a stronger attractive force to the first movable part than to the second movable part. The first movable part will therefore move toward the fixed part first. However, once the first movable part comes into contact with the fixed part, the first movable part may then act as an 'extension' of the fixed part (as each part is made from a ferromagnetic material), strengthening the magnetic field proximate to the side of the first movable part that is not in contact with the fixed part, i.e. strengthening the magnetic field experienced by the second movable part. This then causes the second movable part to be attracted more strongly toward the fixed and first movable parts.

Arrangements in accordance with examples of the present disclosure may provide for much greater overall actuation distances, i.e. the change in length along the actuation direction between the working and reset positions. The actuation distances that are achievable will, as will be appreciated by those skilled in the art, depend on a number of factors, however the total actuation distance compared to a conventional 'two part' actuator known in the art per se may, by way of non-limiting example only, be doubled when compared to the prior art arrangements. The provision of greater actuation distances may allow triggering of elevator safety mechanisms without the need for intermediate levers.

Splitting the movable parts into multiple movable parts may also advantageously make resetting of the electromechanical actuator device easier, i.e. it is easier to remove the actuator from the rail when resetting the device from the working position to the reset position, because the resetting process is carried out in smaller, more manageable steps.

As outlined above, the coil is located within the fixed part. This may, at least in some examples, be achieved by having a hollow fixed part. For example, the ferromagnetic fixed part may have a substantially tubular shape, i.e. it may be cylindrical. Typically, such a hollow fixed part will have at least one side wall, an open end and a closed end, such that the closed end and the side wall(s) 'enclose' the coil, while the open end is arranged to abut the first movable part when the electromechanical actuator device is in the reset position. There may only be a single side wall (e.g. where a tubular construction in used) or there may be multiple side walls. It will be appreciated that the device may have other shapes. For example, the device may be of a cuboid construction or any other suitable shape as appropriate. The fixed and movable parts of the device are preferably mirror symmetric across a central axis of the device extending along the actuation direction through a centre of the core, and in some examples are rotationally symmetric about that axis.

In the reset position, the fixed part may come into contact with the first movable part. Similarly, in the reset position, the first and second movable parts may come into contact with one another. However, it will be appreciated that, in practice, these parts may instead be brought proximate to one another without coming into physical contact.

In accordance with such examples, a face of the open end of the fixed part is arranged such that it abuts or is proximate to a face of the first movable part when in the reset position. Similarly, a further face of the first movable part is arranged such that it abuts a face of the second movable part when in the reset position. These faces may be 'flat', i.e. substantially planar in a plane normal to the actuation direction. However, in some examples, the fixed part and the first movable part each have a respective chamfered portion arranged to abut one another in the reset position. Similarly, in some potentially overlapping examples, the first and second movable parts each have a respective chamfered portion arranged to abut one another in the reset position. Such a chamfered portion provides a sloped profile that is not planar in a plane normal to the actuation direction across the entire contact area in the reset position. Such an arrangement may help to optimise the electromagnetic efficiency of the device by providing a reduced electromagnetic gap, keeping the same distance between the respective parts.

Those skilled in the art will appreciate that electromagnets make use of a conductive coil wrapped around a ferromagnetic core. In examples of the present disclosure, the 'core' may be a part of the fixed part itself. For example, the conductive coil may be wrapped around a side wall or end of the fixed part. However, in some examples, the core is a separate portion housed internally within the device, e.g. within the fixed part. For example, where the fixed part has a substantially tubular construction, the core may be a cylindrical 'rod' comprising ferromagnetic material that extends through at least part of the fixed part. It will of course be appreciated that other constructions in which the core is only partially within the fixed part, and constructions in which the core is partially or wholly within another part of the device such as a movable part, are envisaged.

For optimal alignment, the core may be of a substantially elongate construction, extending substantially along the actuation direction. In some examples, the core is integrally formed with the fixed part. The core may, therefore, be an elongate portion of ferromagnetic material extending from the fixed part.

However, in some potentially overlapping examples at least a portion of the core is integrally formed with the first movable part. In a subset of such examples, the entire core is integrally formed with the first movable part. In some such examples, the core may be an elongate portion of ferromagnetic material extending from the first movable part. In accordance with such examples, the core (or a portion thereof) extends from the first movable part toward the fixed part—and thus into the coil housed therein—along the actuation direction, albeit the extension is in the opposite direction when compared to a core extending from the fixed part. Having the core form part of the first movable part may improve the electromagnetic efficiency of the device.

In the working position, the conductive coil may wrap entirely around the core, or the coil may only partially wrap around the core. While the core may be integrally formed with either the fixed part or the first movable part, examples are envisaged in which both the fixed part and the first movable part each comprise a portion of the core, i.e. each of the fixed and first movable parts has an elongate portion of ferromagnetic material extending toward each other that may abut one another in the reset position. When the core is 'split' between the fixed and first movable parts, the corresponding portions of the core may have the same cross-section such that their adjacent faces 'match' when they come into contact with one another. However, in some such examples, the portion of the core extending from the first movable part has a hollow portion arranged to receive the portion of the core extending from the fixed part when the electromechanical actuator device is in the reset position. Such an arrangement may improve the electromagnetic efficiency of the device by increasing the contact area between the fixed and first movable parts in the reset position.

Typically, the fixed part, the first movable part, the second movable part, and the core will each be formed from the same ferromagnetic material, however this is not essential and different materials may be used for one or more of these. While there are a number of ferromagnetic materials known in the art per se, in some examples the ferromagnetic material used for the fixed part, first movable part, and/or second movable part is iron.

While the examples described above have a fixed part and two movable parts, the principles may apply equally to having one or more further movable parts. Thus, in some examples, the electromechanical actuator device further comprises at least one further movable part arranged to move with respect to the fixed part in the actuation direction, wherein each further movable part is coupled to another of the movable parts by a respective at least one restorative component such that in a working position the respective movable parts are separated along the actuation direction by a respective further actuation distance. For example, a third movable part may be separated from the second movable part via one or more restorative components. As in the examples outlined above, these restorative components may comprise one or more springs. These one or more further movable parts may, in some examples, be substantially identical to the first movable part.

The respective distances between adjacent parts are not necessarily the same, e.g. the first and second actuation distances (together with any further actuation distances) may each be different.

While the movable parts may be permitted to move freely under the influence of the magnetic field induced by the coil, in some examples a guiding system is provided to guide the movement of the movable parts along the actuation direction. This guiding system may, in some examples, form part of the electromechanical actuation device itself, but in other examples it may form a separate part of the elevator system that is arranged to receive the electromechanical actuator device. Such a guiding system may, for example, comprise a housing having one or more elongate slots that extend along the actuation direction, wherein the movable parts of the electromechanical actuator device engage with the slots such that the slots restrict movement of the movable parts so that they move only along the actuation direction.

In a set of examples, the springs coupling the parts together are terminated by a spring stopper provided on the respective parts. Thus the fixed part, first movable part, and/or second movable part may each comprise at least one spring stopper to which a spring is connected. In at least some such examples, the spring stoppers are constructed from a non-ferromagnetic material. Having the spring stoppers formed from a non-ferromagnetic material is particularly advantageous as this may prevent the spring stoppers from interfering with the electromagnetic field established by the coil in use.

The first and/or second movable parts may each be wholly integrally formed or may have a multi-part construction. While the entire movable part may be constructed from the ferromagnetic material, in some examples, the first movable part and/or the second movable part comprises a permanent magnet. In some potentially overlapping examples, the device comprises a third movable part comprising a permanent magnet. This third movable part may be coupled to another movable part, including but not limited to the second movable part, by a restorative component, e.g. of the types described hereinabove. The provision of a permanent magnet within the movable part(s) may advantageously help to overcome the restorative force of the springs when resetting the device. This may be particularly advantageous when relatively stiff springs are employed.

In a set of examples, the restorative components comprise one or more permanent magnets. These permanent magnets may provide a repulsive force that drives the movable parts away from the fixed part, i.e. into the working position. The force provided by the permanent magnets is then overcome when a sufficient current is passed through the conductive coil so as to provide a greater, opposite force that attracts the movable parts—one by one—toward the fixed part. Such an arrangement may advantageously avoid the need for a resilient member such as a spring, however these may be used in combination, i.e. a spring and a permanent magnet may act together so as to bias the device to the working position.

BRIEF DESCRIPTION OF THE DRAWINGS

Certain examples of the present disclosure will now be described with reference to the accompanying drawings, in which.

DETAILED DESCRIPTION

Figure 1:
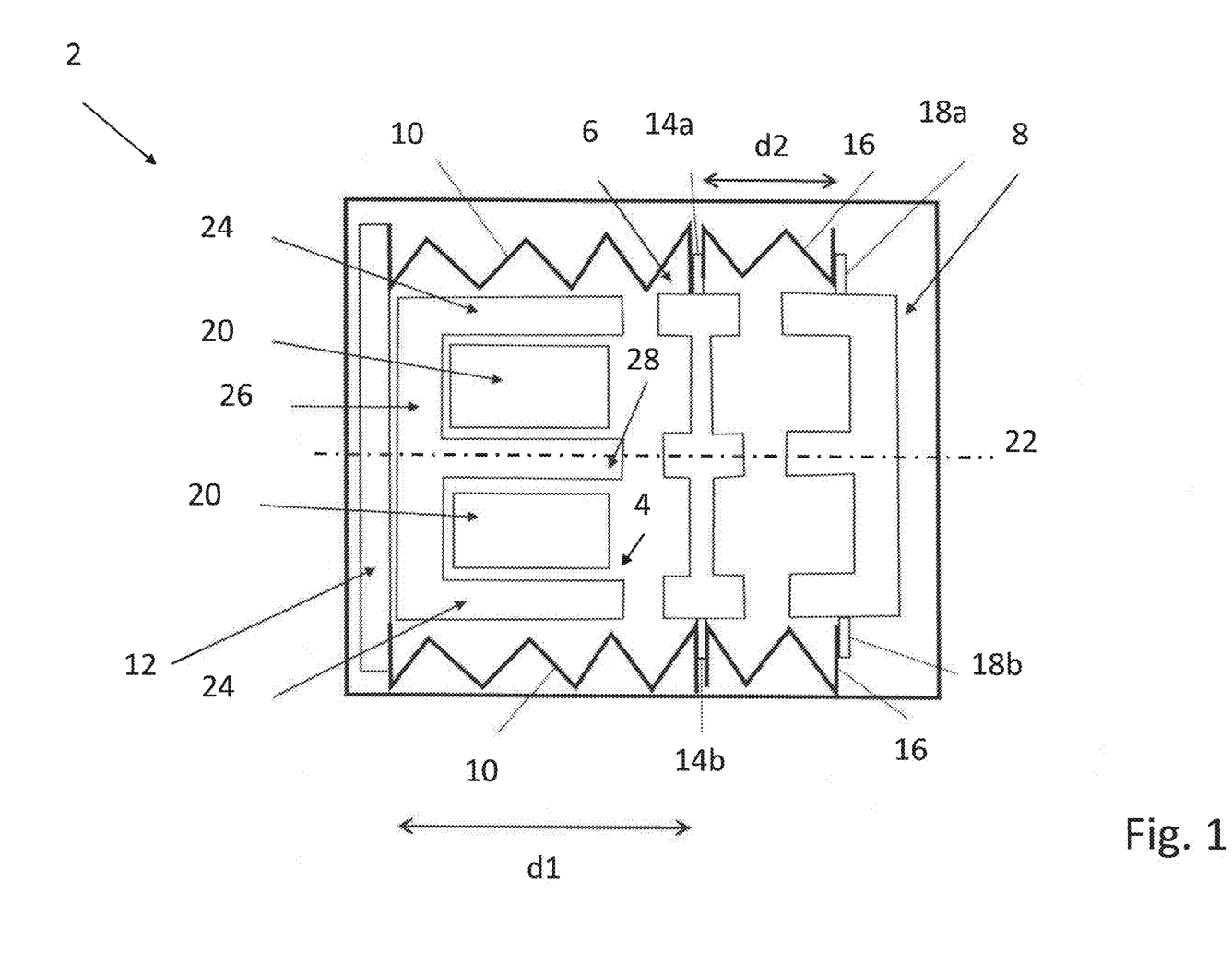
FIG. 1 is a schematic drawing of an electromechanical actuator device in accordance with an example.

FIG. 1 is a schematic drawing of an electromechanical actuator device 2 in accordance with an example. The device 2 comprises a fixed part 4, a first movable part 6, and a second movable part 8. The fixed part 4 and the movable parts 6, 8 each comprise a ferromagnetic material, e.g. iron.

The fixed part 4 is spaced from the first movable part 6 by a spring 10 that is attached to a base 12 of the fixed part 4 at one end of the spring 10. The fixed part 4 and the base 12 may be integrally formed, but they may also be otherwise attached to one another in any suitable manner known in the art per se.

The other end of the spring 10 is connected to spring stoppers 14a, 14b provided on the first movable part 6. Similarly, the first movable part 6 is spaced from the second movable part 8 by a further spring 16, that are attached to the spring stoppers 14a, 14b provided on the first movable part 6 at one end of the spring 16. The other end of the spring 16 is connected to further of spring stoppers 18a, 18b provided on the second movable part 8. Thus these springs 10, 16 couple the respective fixed part 4, first movable part 6, and second movable part 8.

Rather than springs 10, 16, it will be appreciated that, in practice, a different type of restorative component could be used, including but not limited to coil spring, pneumatic (i.e. air), hydraulic, and/or polymer based restorative components that provide the same function. An example in which permanent magnets are used instead of springs is described below with reference to FIG. 13.

The fixed part 4 houses a conductive coil 20, described in further detail below. In this example, the device 2 is cylindrical (i.e. tubular) in construction, such that the fixed part 4, first movable part 6, second movable part 8, and springs 10, 16 are rotationally symmetric about an axis 22 along the actuation direction. The fixed part 4 therefore is cylindrical, having a side wall 24 and a closed end 26. It will, however, be appreciated that the cylindrical construction is not essential, and the device 2 may have a different shape. For example, the device 2 could have a cuboid or elongate construction, where multiple springs are provided, e.g. either side of the fixed and movable parts.

A core 28 of ferromagnetic material extends from the closed end 26 of the fixed part 4, where the core 28 is elongate and extends along the axis 22 of the actuation distance. The coil 20 is 'wrapped' around the ferromagnetic core 28. Like the fixed part 4, the core 28 also comprises a ferromagnetic material (e.g. iron) in this example and is integrally formed with the fixed part 4 itself (though it may be otherwise attached, as appropriate). As outlined below, the coil 20 is arranged to induce a magnetic field to attract the movable parts 6, 8 toward the fixed part 4, i.e. to reset the device 2 after the actuator as has been 'deployed'.

While the core 28 is centralised with respect to the axis 22, it could be offset in other examples, however it is preferable to have it central for optimal electromagnetic efficiency.

The first movable part 6 is 'thinned' across a lateral portion either side of the axis 22. This thinning may advantageously aid the electromagnetic efficiency of the device 2 by reducing the degree to which the first movable part 6 'blocks' the magnetic field induced by the coil 20 to which the second movable part 8 is subjected. It will be appreciated, however, that this thinning is not essential.

In FIG. 1, the electromechanical actuator device 2 is in its 'working' position, in which the fixed part 4, first movable part 6, and second movable part 8 are separated by the springs 10, 16. In particular, the fixed part 4 and the first movable part 6 are separated by a distance d1, while the first movable part 6 is separated from the second movable part 8 by a distance d2. This working position is the position of the device 2 when the coil 20 is not powered.

Figure 2:
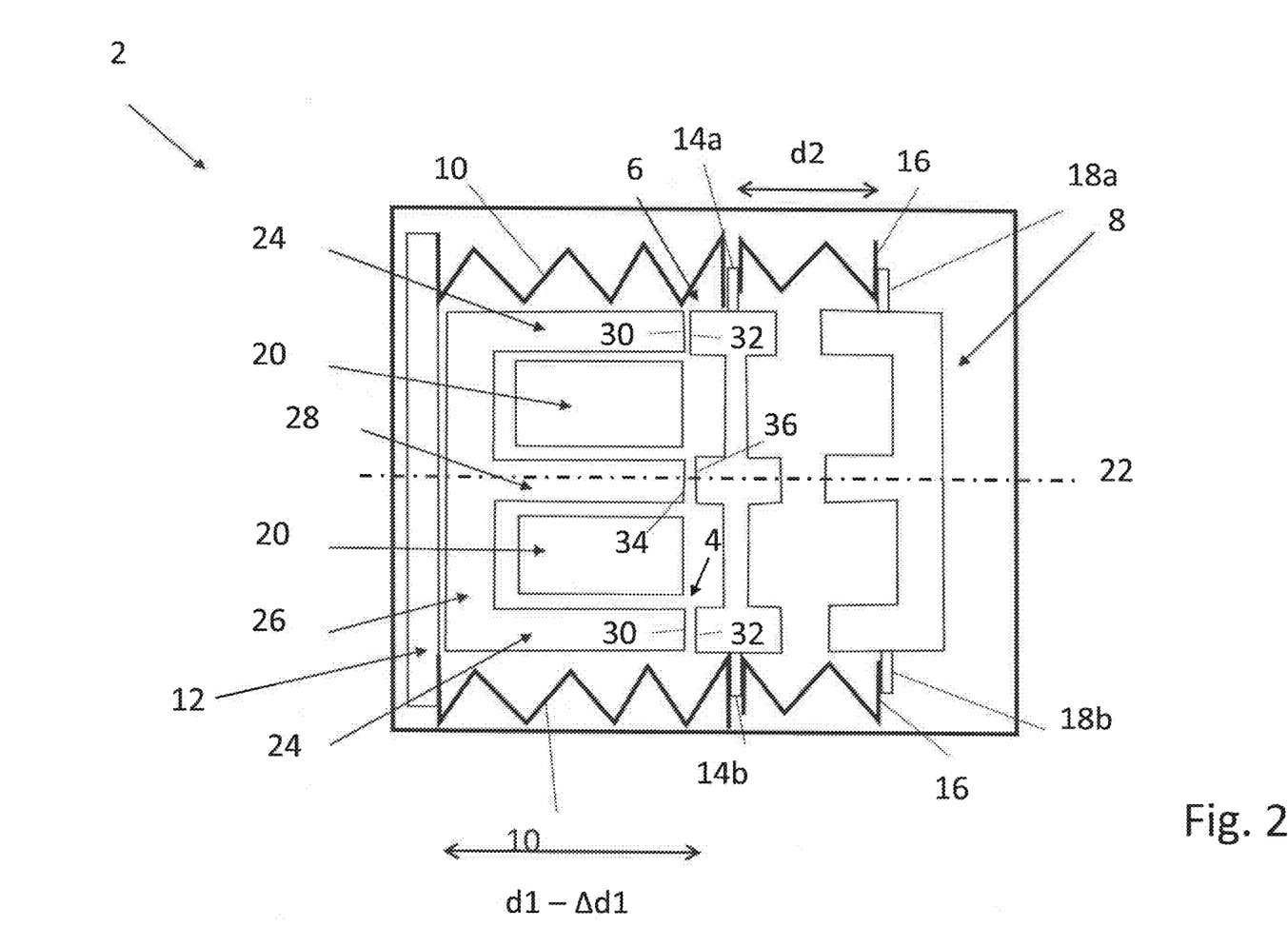
FIG. 2 is a schematic drawing of the device of FIG. 1 as the first movable part is attracted to the fixed part.

Conversely, FIG. 2 is a schematic drawing of the device of FIG. 1 as the first movable part 6 is attracted to the fixed part 4. In particular, FIG. 2 shows an 'intermediate' position during a reset process as the device is driven toward its reset position. A current is passed through the coil 20 that, as will be appreciated by those skilled in the art, induces a magnetic field due to the ferromagnetic core 28 within the coil 20.

This induced magnetic field attracts the first movable part 6 and the second movable part 8 toward the fixed part 4. However, the induced magnetic field is strongest proximate to the fixed part 4, and weaker further from the fixed part 4. As such, the field more strongly attracts the first movable part 6 than the second movable part 8, and thus during this stage the first movable part 6 moves more than the second movable part 8. As a result, the distance between the fixed part 4 and the first movable part 6 is reduced to d1−Δd1. The distance between the first and second movable parts 6, 8 is still approximately d2, however in practice this distance d2 will be slightly reduced in the intermediate position compared with the working position shown in FIG. 1.

As the first movable part 6 moves closer to the fixed part 4, it will then come into abutment with the fixed part 4, i.e. the opposing faces of these parts 4, 6 will come into proximity with one another, e.g. into contact with one another. In other words, the face 30 of the fixed part 4 facing the first movable part 6 in the actuation direction 22 comes into proximity or contact with the opposing face 32 of the first movable part facing the fixed part 4 in the actuation direction 22. Similarly, the face 34 of the core 38 facing the first movable part 6 will come into proximity or contact with the corresponding face 36 of the first movable part 6, as shown in FIG. 3.

Figure 3:
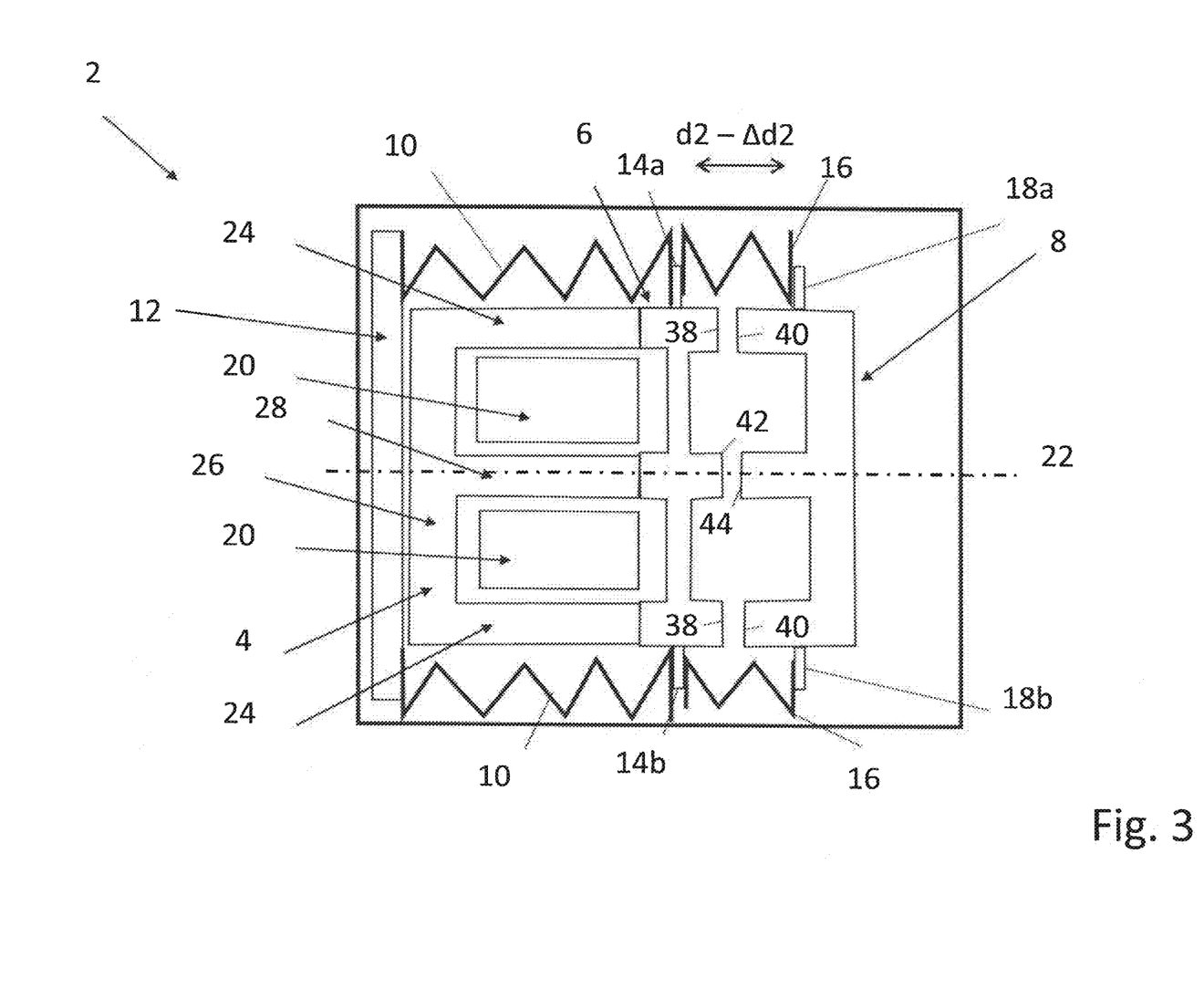
FIG. 3 is a schematic drawing of the device of FIG. 1 as the second movable part is attracted to the fixed and first movable parts.

FIG. 3 is a schematic drawing of the device of FIG. 1 as the second movable part is attracted to the fixed and first movable parts. Once the fixed part 4 and first movable part 6 are in proximity or contact with one another, the first movable part 6 effectively acts as an 'extension' of the fixed part 4, extending the reach of the induced magnetic field caused by the current running through the coil 20. For the sake of clarity, the reference numerals for the now-abutting faces of the fixed part 4 and the first movable part 6 referred to above with reference to FIG. 2 are omitted in FIG. 3.

Under the influence of the induced magnetic field, the second movable part 8 is now more strongly attracted to the fixed part 4 and first movable part 6, which now act as a single unit. Thus, the second movable part 8 now moves toward the first movable part 6 and fixed part 4, reducing the distance between these. As a result, the distance between the movable parts 6, 8 reduces to d2−Δd2.

As the second movable part 8 moves closer to the first movable part 6, it will then come into abutment with the first movable part 6, i.e. the opposing faces of these parts 6, 8 will come into proximity or contact with one another. In other words, the face 38 of the first movable part 6 facing the second movable part 8 in the actuation direction 22 comes into proximity or contact with the opposing face 40 of the second movable part 8 facing the first movable part 6 in the actuation direction 22. Similarly, an inner face 42 of the first movable part 6 will come into proximity or contact with the corresponding inner face 44 of the second movable part 8.

Thus the movable parts 6, 8 move toward the fixed part 4 in stages, i.e. one-by-one.

Figure 4:
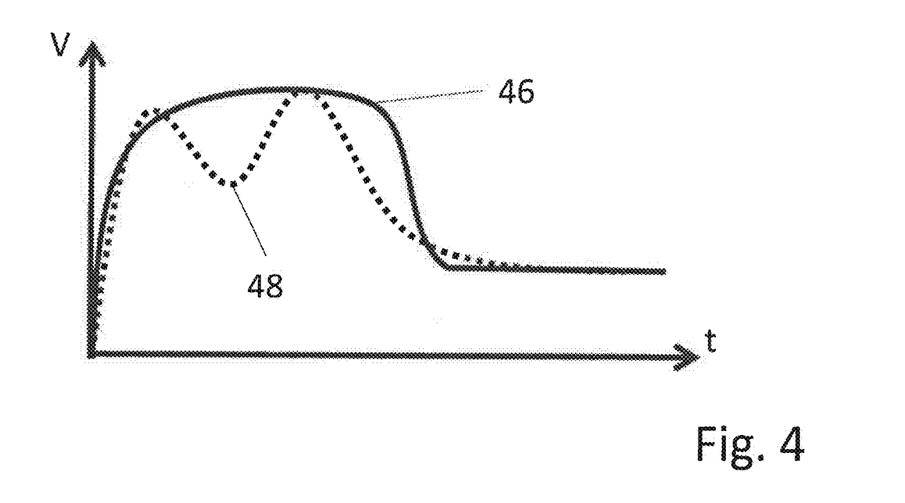
FIG. 4 is a graph showing two different voltage profiles that may be used to reset the device of FIG. 1.

In order to reset the device 2 of FIGS. 1 to 3, a voltage is applied to the coil 20 as outlined above. The voltage used to cause resetting of the device 2 may take different forms, i.e. different voltage profiles. FIG. 4 is a graph showing two different voltage profiles that may be used to reset the device 2 of FIG. 1. The graph is a plot of voltage (V) against time (t). The graph shown in FIG. 4 is a non-limiting example provided for illustrative purposes only.

The first option is a relatively simple profile, shown by plot 46, in which the voltage applied to the coil 20 is ramped up to cause the resetting of both movable parts 6, 8. Once these movable parts 6, 8 are in the reset position, the voltage is reduced to a maintenance value, which is sufficient to keep the device 2 in the reset position. By way of non-limiting example only, during the reset procedure the peak value of the voltage may be approximately 300 V, whereas during maintenance, the voltage may be reduced to approximately between 5 V and 24 V.

Conversely, the second more complex profile, shown by plot 48, has two distinct peaks. The first voltage peak serves to induce the magnetic field to attract the first movable part 6, and the voltage is temporarily reduced before being ramped up again to a second peak so as to induce the magnetic field to attract the second movable part 8. As with the first profile shown by plot 46, the voltage is reduced to a maintenance value, which is sufficient to keep the device 2 in the reset position.

In FIGS. 5 to 10, only one of the symmetrical halves of the respective device is shown for the sake of clarity, where the device is, in practice, symmetrical across the axis 22 along the actuation direction.

Figure 5:
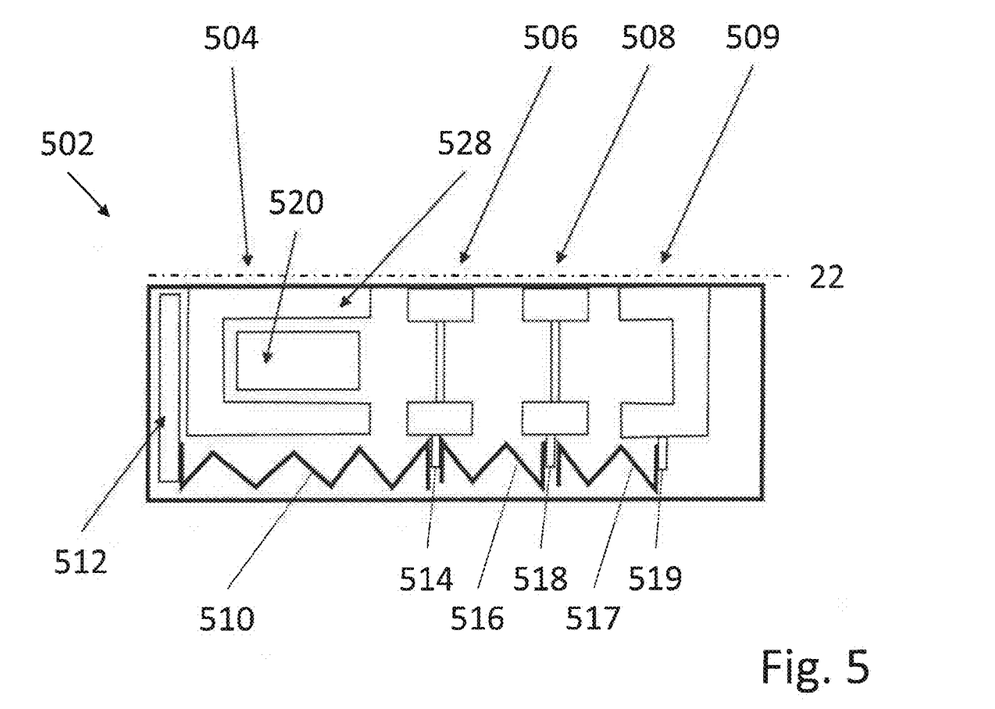
FIG. 5 is a schematic drawing of an electromechanical actuator device in accordance with a further example that employs further movable parts.

FIG. 5 is a schematic drawing of an electromechanical actuator device 502 in accordance with a further example that employs further movable parts. For ease of reference, the reference numerals beginning with a '5' indicate components that similar to the components described above with reference to FIGS. 1 to 3 having a reference numeral corresponding to the number following the '5'.

While the structure of the device 502 is similar to the device 2 described above with reference to FIGS. 1 to 3, there are three movable parts 506, 508, 509 in the device of FIG. 5. Similar to the device 2 described above, a fixed part 504 houses a coil 520, wrapped around a core 528, that is arranged to induce a magnetic field that attracts all three movable parts 506, 508, 509 in multiple stages.

The fixed part 504 is coupled to the first movable part 506 via spring 510, the spring 510 being terminated at a base 512 of the fixed part 504 and a spring stopper 514 on the first movable part 506. The first fixed part 506 is coupled to the second movable part 508 via a further spring 516, the spring 516 being terminated at the spring stopper 514 of the first movable part 506 and a spring stopper 518 on the second movable part 508. Finally, the second fixed part 508 is coupled to the third movable part 509 via another spring 517, the spring 517 being terminated at the spring stopper 518 of the second movable part 508 and a spring stopper 519 on the third movable part 509.

When current is passed through the coil 520, the induced magnetic field initially attracts the first movable part 514 toward the fixed part 504 because the field is strongest closest to the fixed part 504 where the coil 520 is located. Once the first movable part 506 comes into proximity or contact with the fixed part 504, the magnetic field in proximity of the second movable part 508 is increased, thus causing the second movable part 508 to move toward the fixed part 504 and first movable part 506. Finally, once the second movable part 508 comes into proximity or contact with the first movable part 506, the magnetic field in proximity of the third movable part 509 is increased, thus causing the third movable part 509 to also move toward the fixed part 504, first movable part 506, and second movable part 508.

Figure 6:
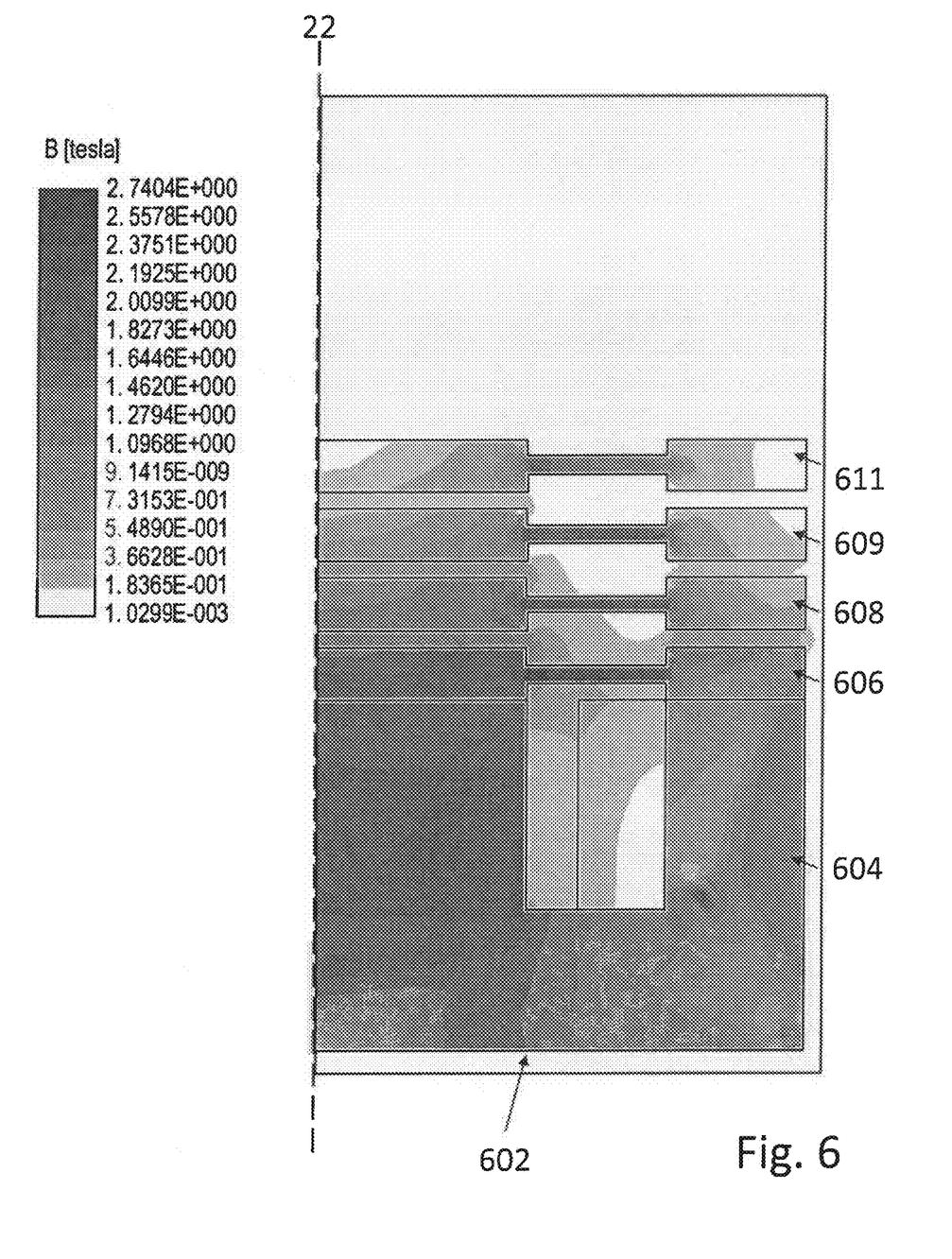
FIG. 6 is a simulation showing the magnetic field around a device having several movable parts in accordance with an example.

FIG. 6 is a simulation showing the magnetic field—more specifically the magnetic flux density—around a device 602 having several movable parts in accordance with a similar device to that described above with reference to FIG. 5, albeit now with four movable parts 606, 608, 609, 611. For ease of reference, the reference numerals beginning with a '6' indicate components that similar to the components described above with reference to FIGS. 1 to 3 having a reference numeral corresponding to the number following the '6'.

The simulation result of FIG. 6 shows the device 602 in an intermediate position in which the first movable part 606 is in proximity or contact with the fixed part 604, but the other movable parts 608, 609, 611 are still separated. As can be seen from the simulation result, the field surrounding the first movable part 606 in proximity or contact with the fixed part 604 is relatively strong, and is sufficient to start attracting the second movable part 608.

Figure 7:
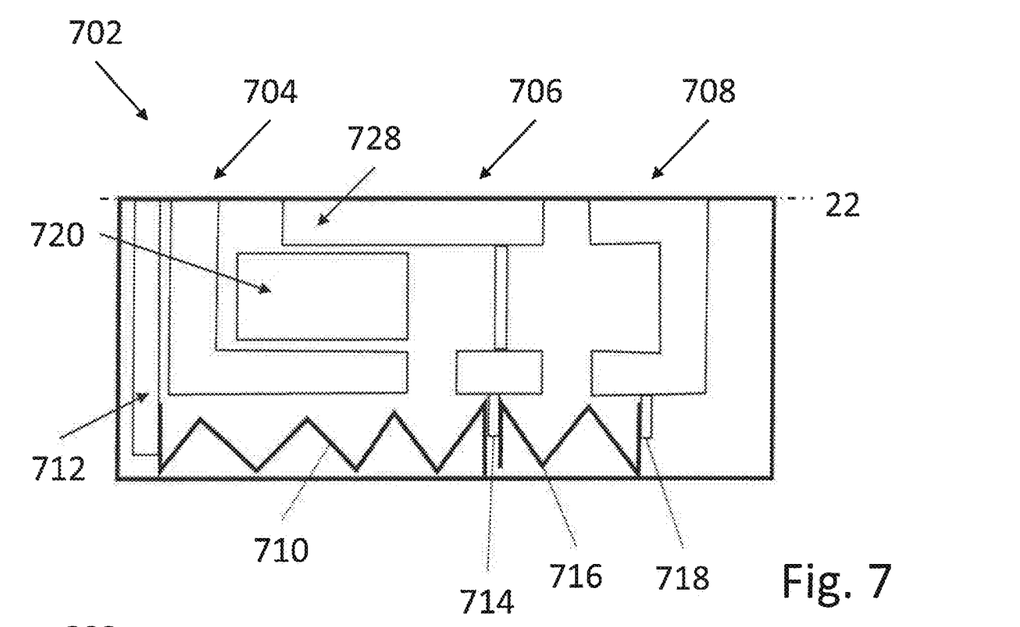
FIG. 7 is a schematic drawing of an electromechanical actuator device in accordance with a further example in which the core is integrally formed with the first movable part.

FIG. 7 is a schematic drawing of an electromechanical actuator device 702 in accordance with a further example in which the core 728 is integrally formed with the first movable part 706. For ease of reference, the reference numerals beginning with a '7' indicate components that similar to the components described above with reference to FIGS. 1 to 3 having a reference numeral corresponding to the number following the '7'.

In the device 702 shown in FIG. 7, the coil 720 is attached to the fixed part 704. The core 728 is integrally formed with the first movable part 706 rather than the fixed part 704. In the reset position, shown in FIG. 7, the coil 720 only partly wraps around the core 728, however the degree of 'overlap' between these will increase as the first movable part 706 moves toward the fixed part 704. It will, of course, be appreciated that variants are envisaged in which the coil 720 does not extend beyond the core 728 in the reset position.

The arrangement shown in FIG. 7 may provide further improvements to the electromagnetic efficiency of the device 702.

Figure 8:
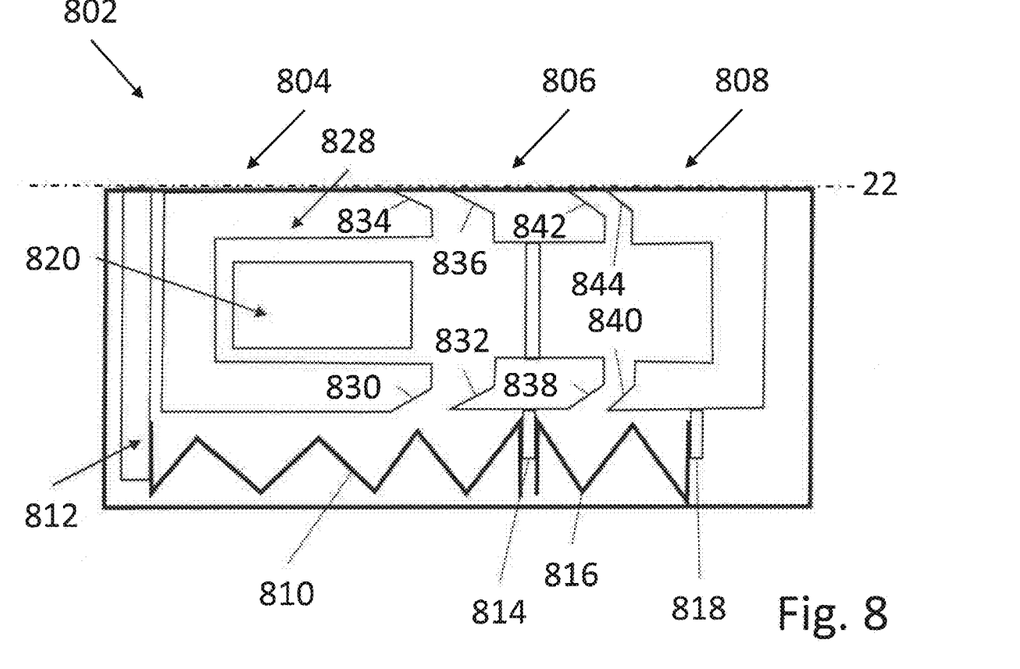
FIG. 8 is a schematic drawing of an electromechanical actuator device in accordance with a further example in which the parts are provided with chamfered portions.

FIG. 8 is a schematic drawing of an electromechanical actuator device in accordance with a further example in which the parts are provided with chamfered portions. For ease of reference, the reference numerals beginning with a '8' indicate components that similar to the components described above with reference to FIGS. 1 to 3 having a reference numeral corresponding to the number following the '8'.

In the device 820, the faces 830, 832, 834, 836, 838, 840, 842, 844 that come into abutment with one another as the device 802 is reset, i.e. as the first movable part 806 and second movable part 808 come into proximity or contact with the fixed part 804, are chamfered. By 'chamfered', those skilled in the art will appreciate that this term means that the faces, i.e. contact surfaces, of the respective parts 804, 806, 808, are not wholly planar, but are instead sloped. These sloped faces, which preferably tessellate with one another (that is, they 'match' when brought into proximity or contact), may advantageously improve the electromagnetic efficiency of the device by keeping the distance between the parts 804, 806, 808 more constant as the movable parts 806, 808 approach the fixed part 804.

Figure 9:
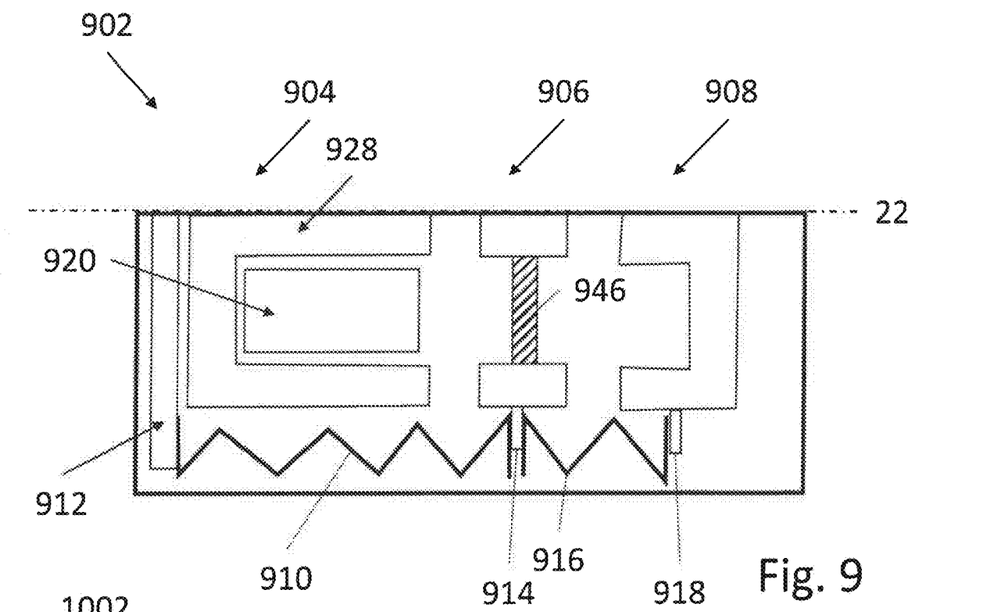
FIG. 9 is a schematic drawing of an electromechanical actuator device in accordance with a further example in which the first movable part includes a permanent magnet.

FIG. 9 is a schematic drawing of an electromechanical actuator device in accordance with a further example in which the first movable part includes a permanent magnet. For ease of reference, the reference numerals beginning with a '9' indicate components that similar to the components described above with reference to FIGS. 1 to 3 having a reference numeral corresponding to the number following the '9'.

The device 902 of FIG. 9 is structurally similar to the device 2 of FIGS. 1 to 3; however, the 'thinned' portion of the first movable part 906 is replaced with a permanent magnet 946. This permanent magnet 946 may help to overcome the restorative force supplied by the springs 910 coupling the first movable part 906 to the fixed part 904, thus making the device 902 easier to reset. While not shown, a further permanent magnet could also be supplied as part of the second movable part 908.

Figure 10:
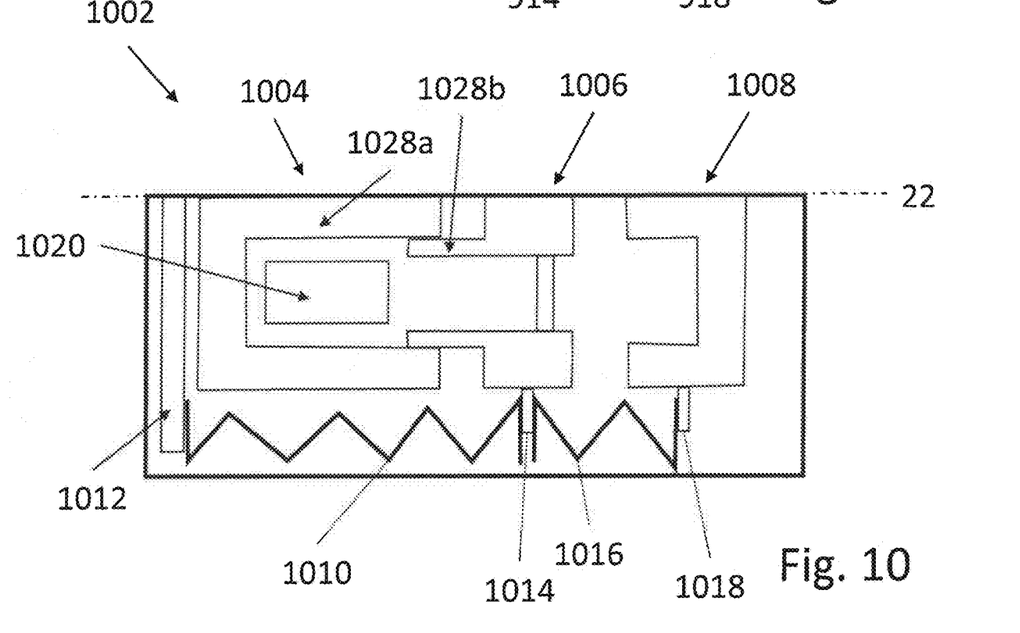
FIG. 10 is a schematic drawing of an electromechanical actuator device in accordance with a further example in which the core is split between the fixed part and the first movable part.

FIG. 10 is a schematic drawing of an electromechanical actuator device in accordance with a further example in which the core is split between the fixed part and the first movable part. For ease of reference, the reference numerals beginning with a '10' indicate components that similar to the components described above with reference to FIGS. 1 to 3 having a reference numeral corresponding to the number following the '10'.

In the device 1002 of FIG. 10, the ferromagnetic core is split into two core portions 1028a, 1028b. The first core portion 1028 extends from the fixed part 1004 in the same manner described hereinabove in relation to the device 2 of FIGS. 1 to 3. However, a second, hollow core portion 1028b extends from the first movable part 1006 toward the fixed part 1004. This second hollow core portion 1028b is arranged such that it has an inner diameter sufficient to receive the first core portion 1028a as the first movable part 1006 moves toward the fixed part 1004. Such an arrangement may improve the electromagnetic efficiency of the device 1002 by increasing the contact area between the fixed part 1004 and the first movable part 1006 in the reset position.

Figure 11:
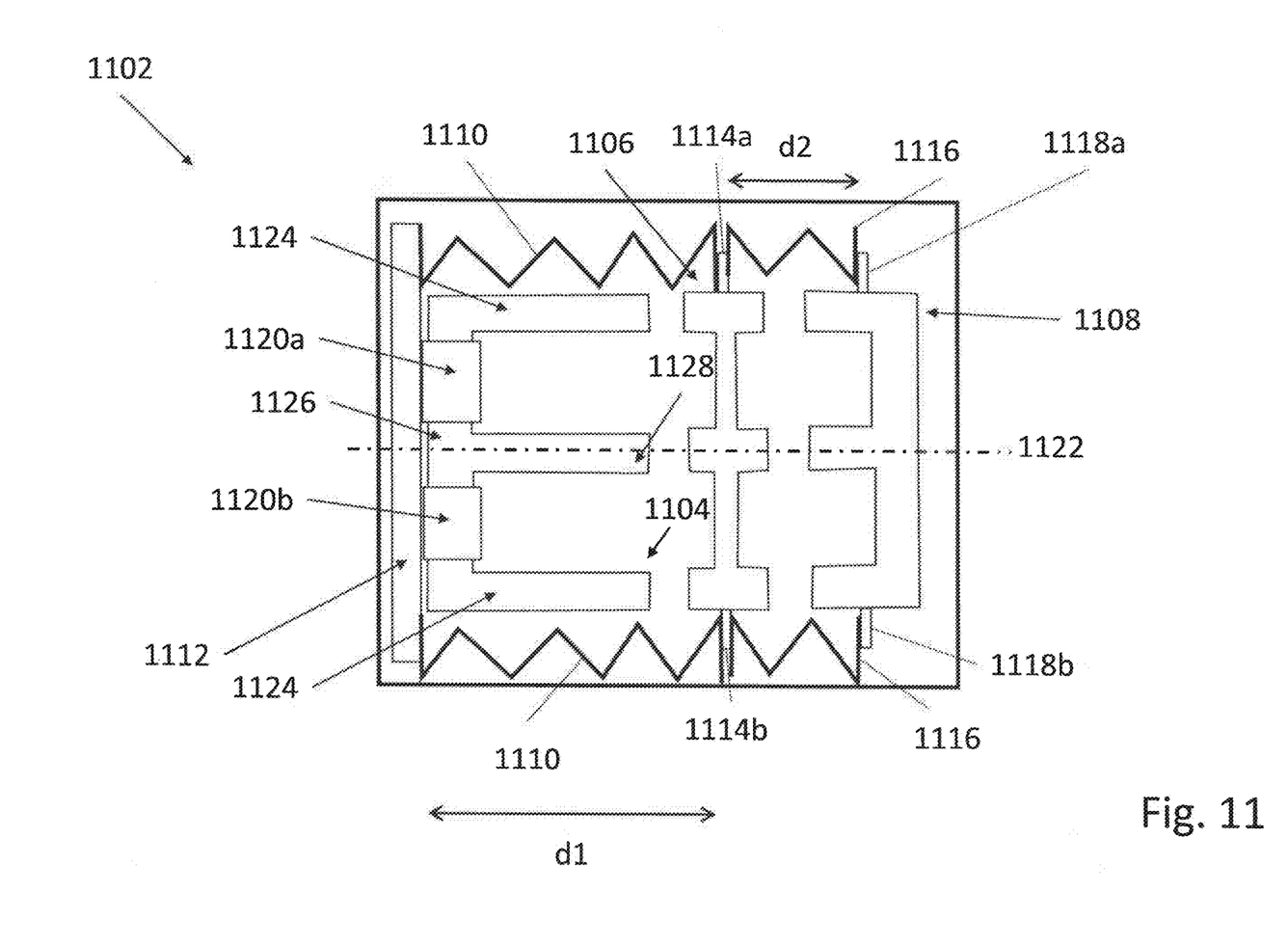
FIG. 11 is a schematic drawing of an electromechanical actuator device in accordance with a further example in which the fixed part itself forms the electromagnetic core.

FIG. 11 is a schematic drawing of an electromechanical actuator device in accordance with a further example in which the fixed part itself forms the electromagnetic core. For ease of reference, the reference numerals beginning with an '11' indicate components that similar to the components described above with reference to FIGS. 1 to 3 having a reference numeral corresponding to the number following the '11'.

In the device 1102 of FIG. 11, two conductive coils 1120a, 1120b are wrapped around the closed end 1126 of the fixed part 1104. In this example, the fixed part 1104, which comprises a ferromagnetic material such as iron, itself acts as the core of the electromagnet formed together with these coils 1120a, 1120b.

Figure 12:
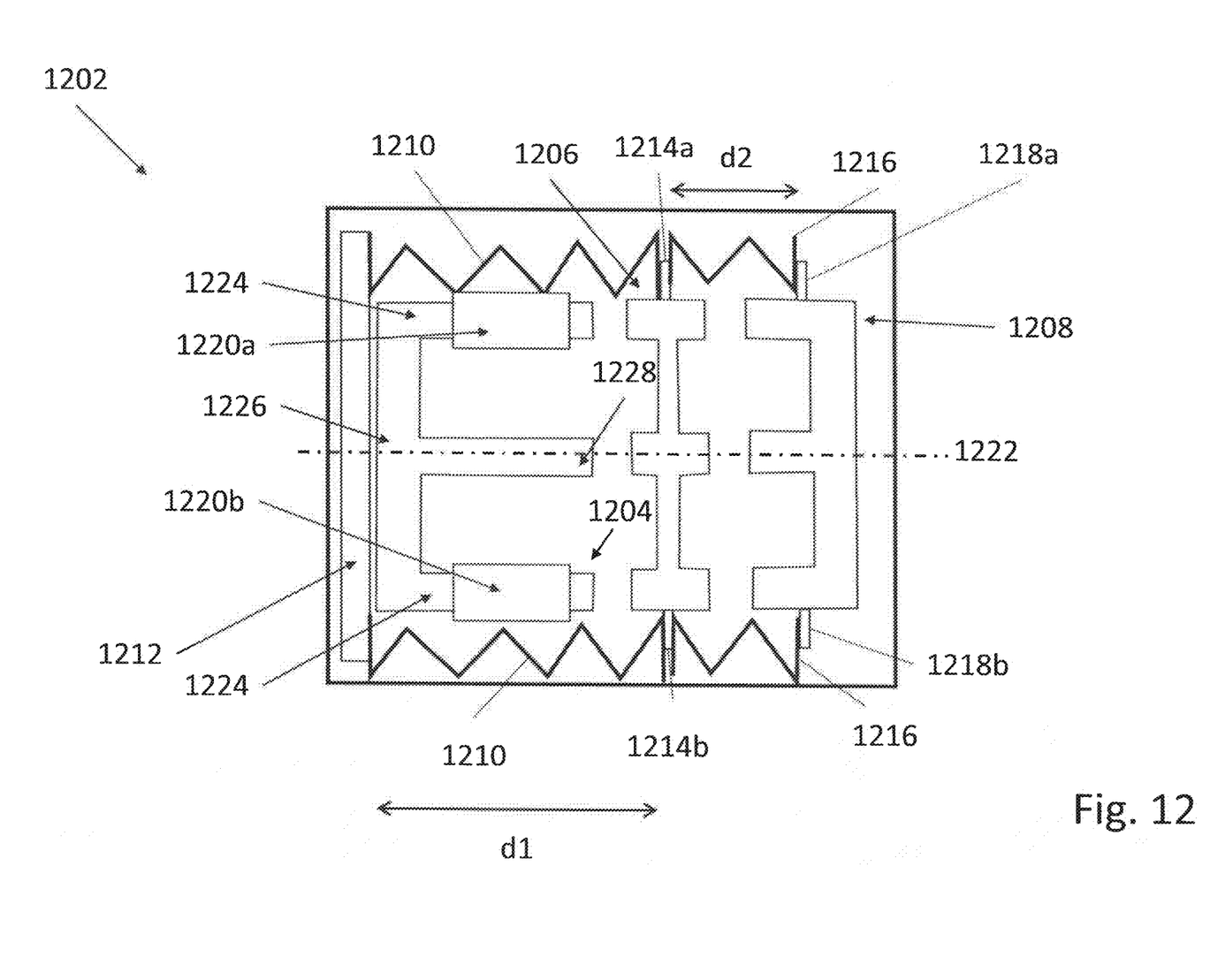
FIG. 12 is a schematic drawing of an electromechanical actuator device in accordance with a further example in which the fixed part itself forms the electromagnetic core.

Similarly, FIG. 12 is a schematic drawing of an electromechanical actuator device in accordance with a further example in which the fixed part itself forms the electromagnetic core. For ease of reference, the reference numerals beginning with a '12' indicate components that similar to the components described above with reference to FIGS. 1 to 3 having a reference numeral corresponding to the number following the '12'.

In the device 1202 of FIG. 12, two conductive coils 1220a, 1220b are wrapped around the side walls 1224 of the fixed part 1104. In this example, the fixed part 1204, which comprises a ferromagnetic material such as iron, itself acts as the core of the electromagnet formed together with these coils 1220a, 1220b.

It will be appreciated that the various coil arrangements described above may be combined in any suitable way. For example, a coil may be wrapped around an elongate central core as per FIG. 1 with further coils wrapped around the closed end and/or side-wall(s) of the fixed part. Alternatively, coils may be wrapped around both the closed end and side wall(s) of the fixed part, with no coil wrapped around a central elongate core (in fact, no such central core may be necessary in such arrangements). However, for ease of reference, these different permutations and combinations are not described in further detail but will be readily understood as falling within the scope of the present disclosure.

Figure 13:
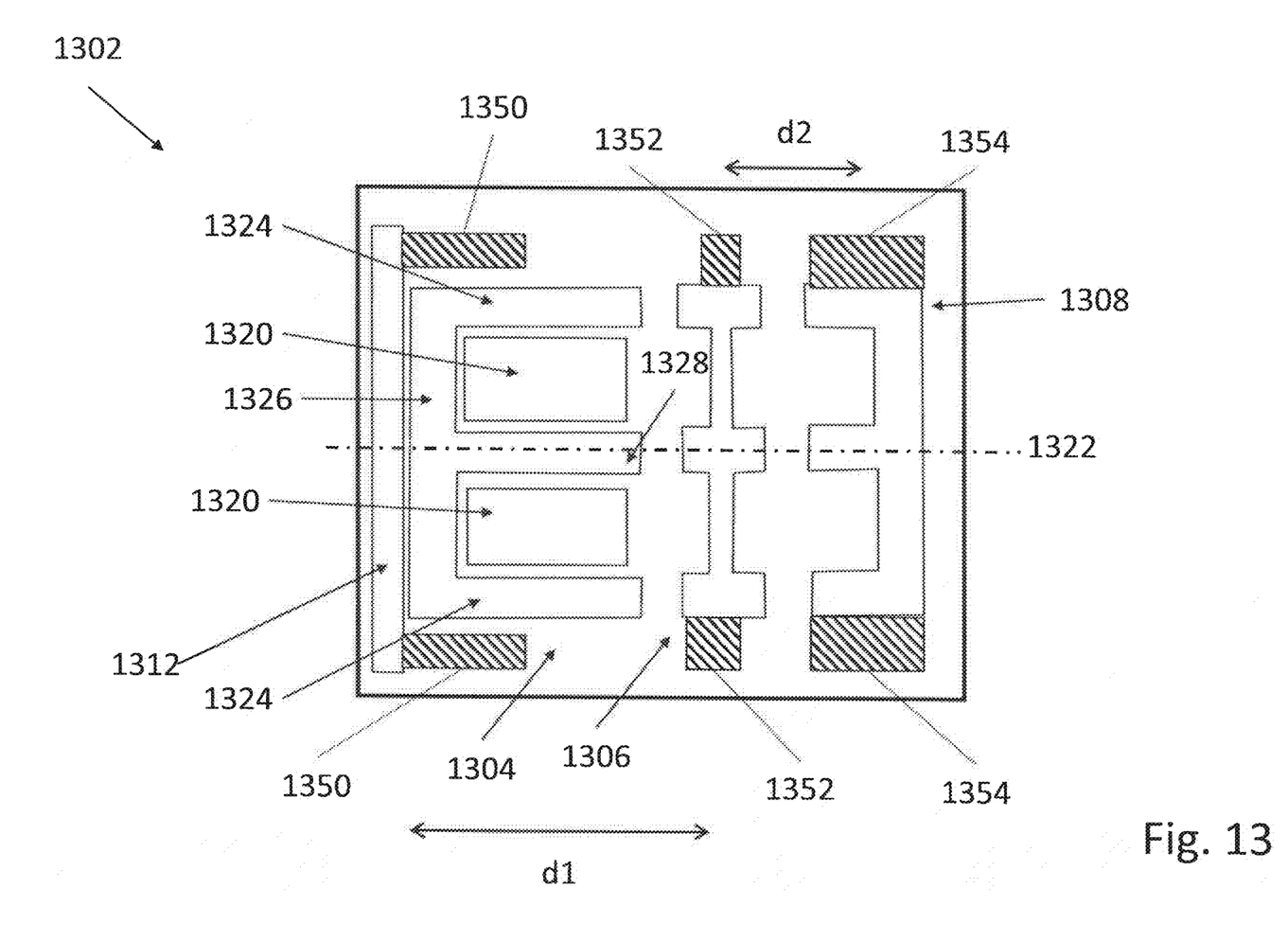
FIG. 13 is a schematic drawing of an electromechanical actuator device in accordance with a further example in which the restorative components are permanent magnets.

FIG. 13 is a schematic drawing of an electromechanical actuator device 1302 in accordance with a further example in which the restorative components are permanent magnets 1350, 1352, 1354. For ease of reference, the reference numerals beginning with a '13' indicate components that similar to the components described above with reference to FIGS. 1 to 3 having a reference numeral corresponding to the number following the '13'.

In the device 1302 of FIG. 13, the fixed part 1304 is provided with a permanent magnet 1350 which, in this example, flanks the side wall 1324 of the fixed part 1304. The first movable part 1306 is flanked by a further permanent magnet 1352, and the second movable part 1308 is similarly flanked by another permanent magnet 1354. These permanent magnets 1350, 1352, 1354 provide a repulsive magnetic force that, in the absence of current in the coil 1320, forces the movable parts 1306, 1308 away from the fixed part 1304 in the working position.

When sufficient current is passed through the coil 1320, the induced magnetic field overcomes the magnetic force provided by the permanent magnets 1350, 1352, 1354. As in the examples given above, the strength of the field arising due to the electromagnet formed by the coil 1320 and ferromagnetic core 1328 first attracts the first movable part 1306 as the field is stronger proximate to the fixed part 1304. The second movable part 1308 is subsequently attracted toward the fixed part 1304 and first movable part 1306 once the field it is subject to is increased, in the same manner described above.

Thus it will be appreciated by those skilled in the art that examples of the present disclosure provide an improved electromechanical actuator device in which the movable part of the actuator is 'split' into multiple movable parts, which may advantageously provide increased actuation distances when compared to similar devices having only a fixed part and a single movable part. While specific examples of the disclosure have been described in detail, it will be appreciated by those skilled in the art that the examples described in detail are not limiting on the scope of the disclosure.

What is claimed is:

1. An electromechanical actuator device comprising:
   a fixed part, a first movable part and a second movable part, each of said movable parts being arranged to move with respect to the fixed part along an actuation direction, wherein the fixed part, the first movable part, the second movable part, and a core of the fixed part each comprises a respective ferromagnetic material; and
   a conductive coil wrapped around the core, said conductive coil being housed at least partially within the fixed part;
   wherein the electromechanical actuator device is arranged such that:
   the first movable part is coupled to the fixed part by at least one restorative component such that, in a working position, the first movable part is separated from the fixed part along the actuation direction by a first actuation distance; and
   the second movable part is coupled to the first movable part by at least one second restorative component such that, in the working position, the second movable part is separated from the first movable part along the actuation direction by a second actuation distance;
   when an electric current is passed through the conductive coil, an induced magnetic field attracts the first and second movable parts toward the fixed part, thereby reducing the first and second actuation distances;
   wherein the fixed part is hollow and comprises a side wall, an open end and a closed end, such that the closed end and the side wall enclose the coil, wherein a face of the open end is arranged to abut a face of the first movable part when the electromechanical actuator device is in a reset position.

2. The electromechanical actuator device as claimed in claim 1:
   wherein the first movable part is thinned across a lateral portion on either side of an axis along the actuation direction and not thinned at a peripheral edge of the first movable part.

3. The electromechanical actuator device as claimed in claim 2, wherein the at least one restorative component or the least one second restorative component comprises at least one spring.

4. The electromechanical actuator device as claimed in claim 1, wherein the fixed part and the first movable part each have a respective chamfered portion arranged to abut one another in the reset position, and/or wherein the first and second movable parts each have a respective chamfered portion arranged to abut one another in the reset position.

5. The electromechanical actuator device as claimed in claim 1, wherein the core is integrally formed with the fixed part.

6. The electromechanical actuator device as claimed in claim 1, wherein the core comprises a portion extending from the fixed part and a portion extending from the first movable part.

7. The electromechanical actuator device as claimed in claim 6, wherein the portion of the core extending from the first movable part has a hollow portion arranged to receive the portion of the core extending from the fixed part when the electromechanical actuator device is in the reset position.

8. The electromechanical actuator device as claimed in claim 1, comprising at least one further movable part arranged to move with respect to the fixed part in the actuation direction, wherein each further movable part is coupled to another of the movable parts by a respective at least one third restorative component such that in a working position the respective movable parts are separated along the actuation direction by a respective further actuation distance.

9. The electromechanical actuator device as claimed in claim 1, comprising a guiding system arranged to guide the movement of the movable parts along the actuation direction.

10. The electromechanical actuator device as claimed in claim 9, wherein the guiding system comprises a housing having one or more elongate slots that extend along the actuation direction, wherein the movable parts of the electromechanical actuator device engage with the slots such that the slots restrict movement of the movable parts so that they move only along the actuation direction.

11. The electromechanical actuator device as claimed in claim 3, wherein the at least one spring is terminated by a spring stopper, wherein the spring stopper is constructed from a non-ferromagnetic material.

12. The electromechanical actuator device as claimed in claim 1, wherein the first movable part and/or the second movable part comprises a permanent magnet, and/or wherein the device comprises a third movable part comprising a permanent magnet.

13. An elevator system comprising an elevator car arranged to move within a hoistway and an electromechanical actuator device in accordance with claim 1, wherein the elevator car is prevented from moving within the hoistway when the electromechanical actuator device is in the working position.

* * * * *